Patented May 9, 1950

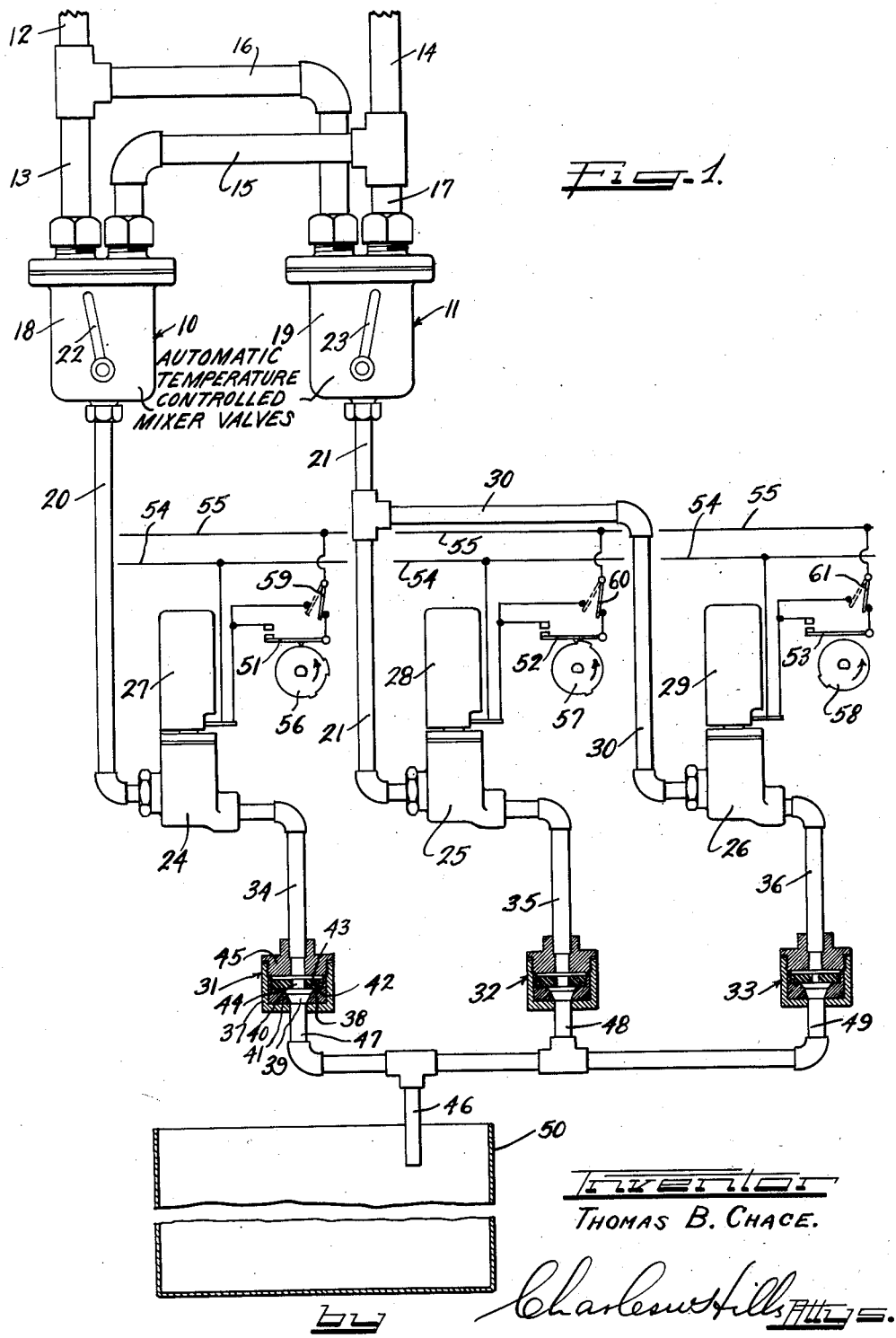

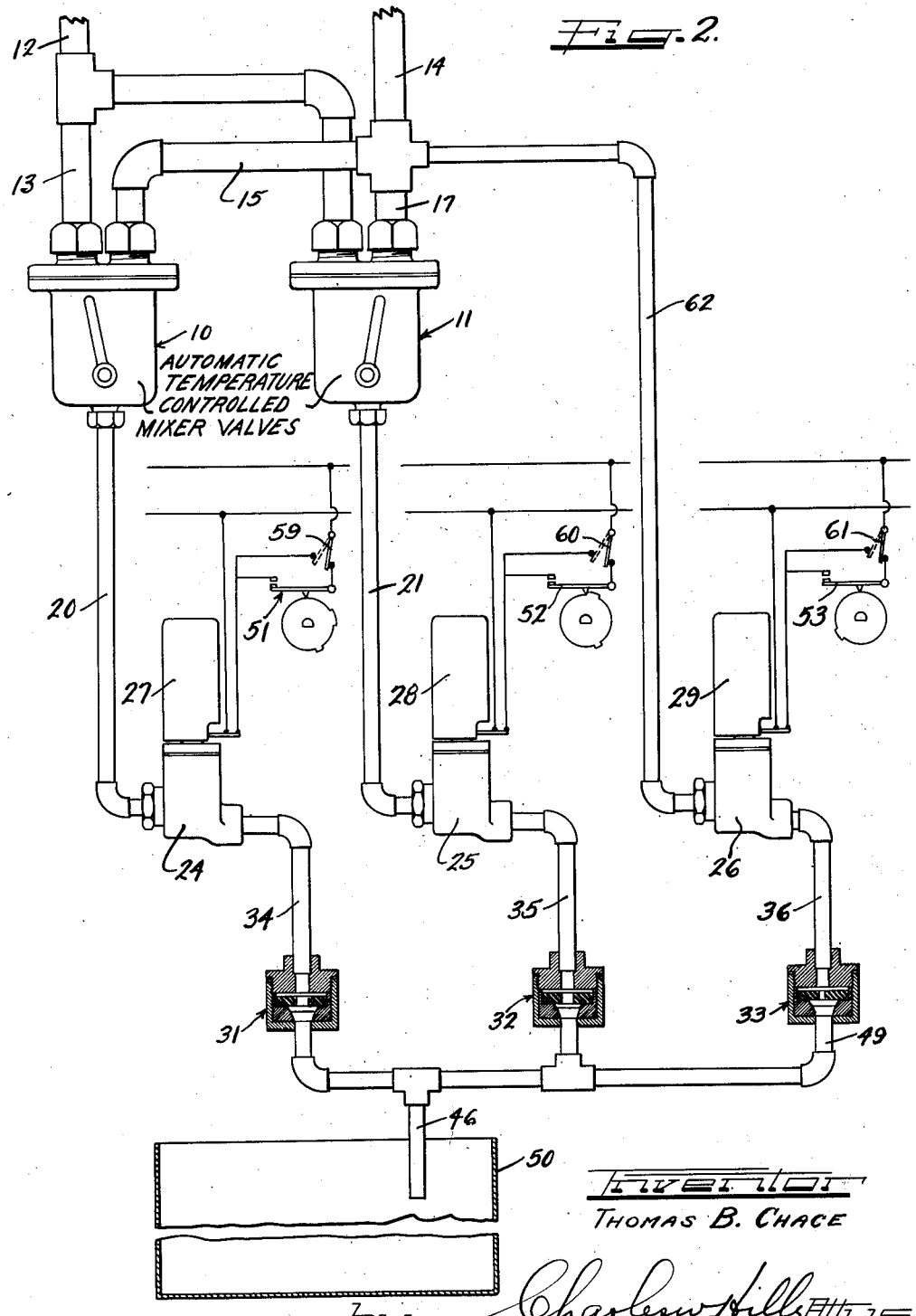

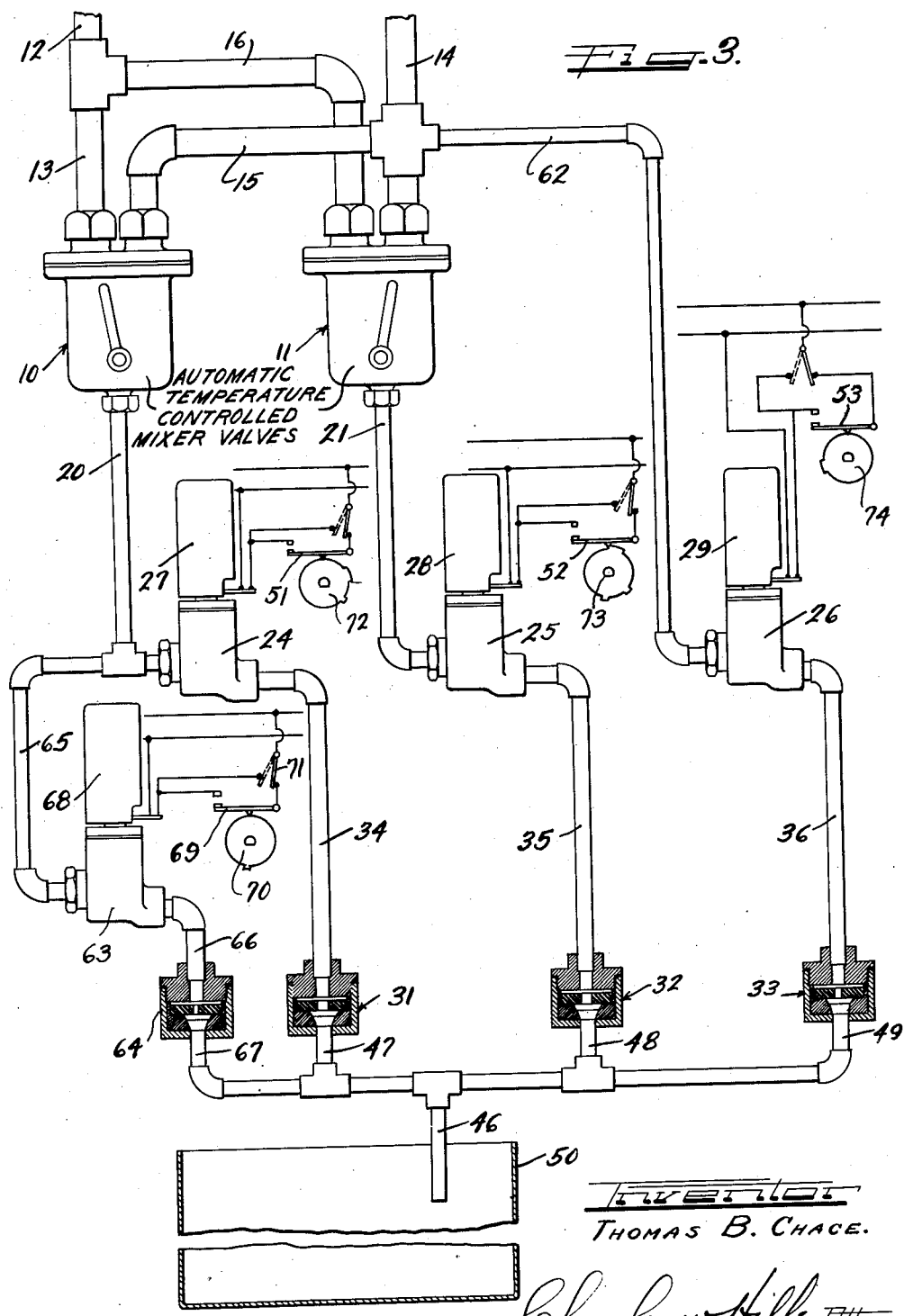

2,506,700

UNITED STATES PATENT OFFICE 2,506,700

FLUID CONTROL SYSTEM

Thomas B. Chace, Winnetka, Ill., assignor to The Dole Valve Company, Chicago, Ill., a corporation of Illinois Application July 14, 1944, Serial No. 544,954

2 Claims. (Cl. 236—12)

1

This invention relates to a fluid control system, and more particularly to a system having dual automatic temperature controlled mixer valves with arrangements for combining and delivering fluids in different selected quantities at different selected temperatures.

In many fluid supply systems it is desirable to deliver fluid at different predetermined temperatures and in different predetermined amounts at different successive stages in a cycle of operation. This is particularly true of the water supply system for an automatic washing machine. Due to the fact that the amount of hot water usually available in a home is limited, it is extremely important that the use of the hot water be as economical as is consistent with the results desired.

It is one of the principal features and objects of the present invention to provide a novel fluid control system in which a wide variety of fluid delivery temperatures may be obtained through the use of only two automatic temperature controlled mixer valves.

A further object of the present invention is to provide a novel fluid control system and bypass combination.

Another object of the present invention is to provide novel means for selecting and combining fluid of different predetermined temperatures in different selected proportions.

A still further object of the present invention is to provide a novel fluid control system having dual automatic temperature controlled mixer valves, and having novel means for bypassing and mixing fluids of different temperatures and delivering a predetermined quantity of the resulting mixed fluid.

The novel features which I believe to be characteristic of my invention are set forth with particularity in the appended claims. My invention itself, however, both as to its organization, method of operation, and manner of construction, together with further objects and advantages thereof, may best be understood by reference to the accompanying drawings, in which:

Figure 1 is a diagrammatic illustration of a fluid control system embodying the novel teachings of the present invention;

Figure 2 is a diagrammatic illustration of a modified form of the present invention; and Figure 3 is a diagrammatic illustration of a third embodiment of the present invention.

The fluid control system diagrammatically illustrated in Figure 1 of the drawings includes an automatic temperature controlled mixer valve 10 and a second automatic temperature controlled mixer valve 11. These two mixer valves provide a dual mixer valve unit and while they may be contained within a single housing if desired, they have been illustrated as separate units in the diagrammatic illustration in order to emphasize their distinctive separate functions. The automatic temperature controlled mixer valve 10 is connected to a hot fluid inlet duct 12 through a pipe 13 and is connected to the cold fluid supply duct 14 through a pipe 15. The automatic temperature controlled mixer valve 11 is connected to the hot fluid supply duct 12 through a pipe 16 and to the cold fluid supply duct 14 through a pipe 17.

The automatic temperature controlled mixer valves 10 and 11 may be of any conventional design such, for example, as shown in my earlier filed Patent No. 2,321,573, issued June 15, 1943, entitled "Washing machine," having a temperature responsive means therein for automatically proportioning fluid of normally different temperatures to maintain the resulting mixed fluid at a predetermined temperature level. The fluid, such, for example, as water, is mixed within the housings 18 and 19 of the devices 10 and 11 respectively, and is delivered through mixed fluid delivery pipes 20 and 21. The automatic temperature controlled mixer valves 10 and 11 are preferably provided with temperature adjusting members 22 and 23 respectively for changing the temperature setting of the temperature responsive means to maintain the mixed fluid at any of a number of different predetermined temperature levels. As will presently be understood, the temperature adjusting member 22 will be set to deliver mixed fluid at a different temperature level from that determined by the temperature adjusting member 23 of the mixer valve 11.

In the fluid control system of the embodiment of the invention shown in Figure 1 of the drawings, three electrically operated shut-off valves 24, 25 and 26 are provided. These electrically operated shut-off valves may be of any conventional design and are under the control of solenoids 27, 28 and 29 respectively. These solenoids 27, 28 and 29 are associated with their shut-off valves in such a manner that when energized the valve is open, and when de-energized, the valve is closed.

The delivery pipe 20 is connected to the upstream side of the shut-off valve 24 while the pipe 21 is connected to the upstream side of the shut-off valve 25. A bypass conduit 30 branching off from the delivery pipe 21, is connected to the upstream side of the shut-off valve 26.

The downstream side of the shut-off valves 24, 25 and 26, are connected to automatic constant rate of flow maintaining devices 31, 32 and 33 through pipes 34, 35 and 36 respectively. These flow control devices 31, 32 and 33 are preferably of a design similar to that described in the copending application of Leslie A. Kempton, entitled "Flow control," Serial No. 545,312, filed July 17, 1944, now Patent No. 2,454,929 dated November 30, 1948, and assigned to the same assignee as the present invention. Each of these constant rate of flow maintaining devices is arranged to deliver a substantially constant volume of liquid therethrough in a given interval of time irrespective of wide variations or fluctuations in pressure on the inlet and outlet sides thereof. For the purpose of understanding the present invention, it is sufficient to say that the constant rate of flow maintaining device 31 includes a housing 37 in which a seat 38 is disposed having a central opening 39 defined by two frusto-conical surfaces 40 and 41. The frusto-conical surface 40 merges into a shoulder 42 upon which a disk 43 of resilient material having a central orifice 44 is disposed. The central orifice 44 is substantially smaller than the upper edge of the frusto-conical surface 40 and for that reason it will be understood that as the pressure drop across the resilient disk 43 increases the disk 43 is flexed to vary the effective size of the orifice 44.

It has been found that with a construction of this kind a constant delivery rate will be maintained over a wide variation in pressure, such, for example, as over a variation in pressure from 20 pounds per square inch to 150 pounds per square inch. A cap 45 is provided for the housing 37 which retains the seat member 38 in place.

The construction of the flow control devices 32 and 33 is similar to that described in connection with the flow control device 31 with the exception that in this particular embodiment of the invention the flow control device 33 is arranged to deliver fluid at a substantially lower rate than that provided by the flow control devices 31 and 32. Merely by way of example, the flow control devices 31 and 32 may be set for delivering fluid at a rate of five gallons per minute, while the flow control device 33 is arranged to deliver fluid at a rate of two gallons per minute.

The downstream sides of the flow control devices 31, 32 and 33 are connected to a common outlet pipe 46 through pipes 47, 48 and 49 respectively. This outlet pipe 46 is diagrammatically illustrated as being disposed over a container or tub 50 which may, for example, be the fluid containing tub of an automatic washing machine.

In the embodiment of the invention illustrated in Figure 1, the shut-off valves 24, 25 and 26 are arranged to be automatically controlled through cam operated switches 51, 52 and 53 respectively, which, when closed, energize their associated solenoids 27, 28 and 29 of the shut-off valves 24, 25 and 26, respectively; a suitable source of power represented by the power supply conductors 54 and 55 being provided for the purpose. Timer driven cams 56, 57 and 58 are provided for actuating the switches 51, 52 and 53. For the purpose of understanding the present invention, it is sufficient to state that the cams 56, 57 and 58 are driven at the same speed, they being preferably mounted on a common cam shaft (not shown) driven by a timer motor (not shown).

The time at which a switch is closed and the duration of its closure is determined by raised peripheral portions on the cam. As shown, the switch 52 is arranged to be closed first and remains closed for a predetermined period. For example, if the tub 50 is to be supplied with fifteen gallons of water the switch 52 would be closed for a period of three minutes, since the flow control device 32 permits water to flow therethrough at a five gallon per minute rate. After the elapse of three minutes the switch 52 opens. At a later time switch 51 closes and remains closed for a period, such, for example, as three minutes, which causes fifteen gallons of fluid supplied from the delivery pipe 20 of the mixer valve 10 to be delivered to the tub 50. At a later time both switches 51 and 52 will close, causing fluid from the mixer valve 10 as well as fluid from the mixer valve 11, to be delivered to the tub 50. Since fluid passing through the flow control device 31 as well as through the flow control device 32 is flowing at the rate of five gallons per minute, the switches 51 and 52 are only held closed for a minute and a half, since this period will deliver the required fifteen gallons to the tub 50. At a still later point in the cycle of operation, the switch 53 closes, which causes fluid from the mixer valve 11 to be delivered through the flow control device 33 to the tub 50. This might be, by way of example, a spray rinse operation where a much smaller quantity of fluid is required. As shown, this fluid might be caused to flow for a period of three minutes, which will mean that six gallons of water is delivered to the tub 50.

The above described example of the control of the shut-off valves 24, 25 and 26 has been made to illustrate how fluid might be delivered in an automatic washing machine where a preliminary soak period at one temperature is required, then a wash period at a higher temperature, then a wash-rinse period at an intermediate temperature between the other two temperatures, and finally a spray-rinse at a lower temperature. To this end the automatic temperature controlled mixer valve 10 might be set to maintain a constant fluid temperature in the delivery pipe 20 of 160°, while the automatic temperature controlled mixer valve 11 might be set to maintain a constant fluid temperature of 100° in the fluid delivery pipe 21. Under such circumstances the initial soak period will occur at 100° temperature, the wash period will take place at 160° temperature, the wash-rinse period will take place at 130° temperature and the spray-rinse will take place at 100° temperature.

In order to illustrate the flexibility of this control system each of the solenoids 27, 28 and 29 have a manual switch 59, 60 and 61 respectively, which, when thrown from the full-line positions, as shown in Figure 1, to the dotted line positions, will effect energization of the associated solenoids, irrespective of the positions of the cams 56, 57 and 58.

With the above described fluid control system it will readily be apparent that a number of different temperatures may be obtained in the fluid supplied to the tub 50 without changing the setting of the automatic temperature controlled mixer valves 10 and 11. With the mixer valve 10 set for 160° and the mixer valve 11 set for 100°, the opening of shut-off valve 24 will cause fluid to be delivered to the tub 50 at 160° temperature. The opening of valves 24 and 26 simultaneously will cause fluid to be delivered at 143° temperature. The opening of valves 24 and 25 simultaneously will cause fluid to be delivered at 130° temperature. The opening of valves 24, 25 and 26 simultaneously will cause fluid to be delivered at 125° temperature. The opening of valve 25 will cause fluid to be delivered at 100° temperature. Thus, with fluids of only two different temperatures we are able to obtain five different final delivery temperatures to the tub 50.

It will also be apparent that flexibility is obtained in the delivery rate of fluid to the tub, particularly with respect to the fluid from the mixer valve 11. With valve 26 open fluid is delivered at a rate of two gallons per minute. With valve 25 open fluid is delivered at the rate of five gallons per minute. With both valves 25 and 26 open fluid is delivered at a rate of seven gallons per minute. This enables very rapid tub filling of fluid at the temperature determined by the mixer valve 11.

Figure 2 of the drawings illustrates a second embodiment of the present invention and differs from the first embodiment primarily in the manner in which fluid is supplied to the spray-rinse shut-off valve. For purposes of simplicity, the portions of the fluid control system of Figure 2 which correspond to similar parts of Figure 1 have been given the same reference numerals.

The fluid control system of Figure 2 includes two automatic temperature controlled mixer valves 10 and 11 which are supplied with hot and cold fluid from the fluid supply pipes 14 and 12 respectively. The fluid delivery pipes 20 and 21 of the mixer valves 10 and 11 are connected with the shut-off valves 24 and 25. These shut-off valves 24 and 25 are in turn connected through pipes 34 and 35 to the constant rate of flow maintaining devices 31 and 32, and then to the fluid outlet pipe 46. The shut-off valve 26 is directly connected through a bypass pipe 62 to the cold water supply main 14. The downstream side of the shut-off valve 26 is connected through a pipe 36 to the constant rate of flow maintaining device 33 and thence through a pipe 49 to the outlet pipe 46 of the system.

Cam actuated switches 51, 52 and 53, or the manually operated switches 59, 60 and 61, control the energization of the solenoids 27, 28 and 29 respectively of the shut-off valves 24, 25 and 26.

In this embodiment of the invention it will be noted that the spray-rinse is obtained directly from the cold water supply main in order to conserve the hot water supply. As the cams are shown in Figure 2 of the drawings, a low temperature soak period is provided in which fluid from the mixer valve 11 is supplied to the tub 50. At a second stage in the cycle of operation hot water supplied from the mixer valve 10 is delivered to the tub 50. At a third stage in the cycle of operation a mixture of water from the mixer valve 10 and from the mixer valve 11 is obtained which is supplied to the tub 50 for a wash-rinse. The final spray-rinse in which water is delivered at a lower rate is obtained directly from the cold water supply main 14, the supply being arranged to bypass both the mixer valve 10 and the mixer valve 11.

The third embodiment of the present invention illustrated in Figure 3 of the drawings employs one bypass conduit obtained directly from one of the fluid supply mains, and employs a second bypass conduit obtained from the delivery side of one of the automatic temperature controlled mixer valves. More particularly, in the fluid control system of Figure 3 two automatic temperature controlled mixer valves 10 and 11 are connected to the fluid supply mains 12 and 14. Thus, as in the embodiment shown in Figure 1, both hot and cold water is supplied to the mixer valve 10 as well as to the mixer valve 11. The mixed fluid outlet pipe 20 of the mixer valve 10 is connected to the shut-off valve 24 which in turn is connected to the constant rate of flow maintaining device 31 through a pipe 34. The mixed fluid outlet pipe 21 of the mixer valve 11 is connected to the shut-off valve 25 which in turn is connected to the constant rate of flow maintaining device 32 through the pipe 35. Fluid passing through the flow-control devices 31 and 32 are passed to the tub delivery pipe 46 through pipes 47 and 48. Fluid from the cold fluid supply main 14 is also passed through a bypass pipe 62 to a shut-off valve 26, and thence through pipe 36 to the constant rate of flow maintaining device 33. After passing through the flow control device 33 the fluid passes through a pipe 49 to the tub delivery pipe 46. As is indicated in the drawing, the flow control device 33 is set to permit the passage of fluid therethrough at a lower rate than that of the flow control devices 31 and 32.

In the fluid control system of Figure 3, a fourth shut-off valve 63 and a fourth constant rate of flow maintaining device 64 are provided. Fluid from the mixed fluid delivery duct 20 of the automatic temperature controlled mixer valve 10 is passed through a pipe 65 to the upstream side of the shut-off valve 63. The downstream side of the shut-off valve 63 is connected through a pipe 66 to the flow control device 64. The downstream side of the flow control device 64 is connected through a pipe 67 to the tub delivery pipe 46. This constant rate of flow maintaining device 64 may be set to deliver fluid at any desired rate, and by way of illustration has been indicated as being arranged to deliver fluid at a rate different from the flow control devices 31, 32 and 33. To illustrate the operation of the flow control system of Figure 3 let it be assumed that the flow control devices 31 and 32 are set to deliver fluid at a five gallons per minute rate; that the flow control device 33 be set to deliver fluid at a two gallons per minute rate; and that the flow control device 64 be set to deliver fluid at a one gallon per minute rate.

The shut-off valve 63 is provided with a solenoid 68 which when energized opens the shut-off valve 63 and which when de-energized closes the shut-off valve 63. The solenoid 68 is under the control of a cam operated switch 69 actuated by a timer driven cam 70. It may also be energized through a manually operated switch 71.

The switches 51, 52 and 53 associated with the solenoids 27, 28 and 29 are provided with different cams in this embodiment of the invention, by way of example, than those previously described in connection with Figure 1. More particularly, the switches 51, 52 and 53 are provided with cams 72, 73 and 74 having raised peripheral portions as shown in the drawings. With the cams 70, 72, 73 and 74 as shown, and with the automatic temperature controlled mixer valve 10 set to deliver fluid at 160°, and the automatic temperature controlled mixer valve 11 set to deliver fluid at 100° the following cycle of operation will occur: Fluid at 100° is first delivered from the mixer valve 11 through the shut-off valve 25 and the flow control device 32 to the tub delivery pipe 46. At a second stage in the cycle of operation 160° fluid is delivered from the mixer valve 10 through the shut-off valve 24 and the flow control device 31 to the delivery pipe 46. At a third stage in the cycle of operation 130° fluid is delivered to the delivery pipe 46 by opening the shut-off valves 24 and 25. Since the flow control devices 31 and 32 have the same rate of flow setting, the temperature of the fluid delivered to the delivery pipe 46 will be substantially 130°.

At a fourth stage in the cycle of operation, 160° fluid passes through the shut-off valve 63 and the flow control device 64 is mixed with 100° fluid passed through the shut-off valve 25 and the flow control device 32. Since the flow control device 32 has a flow rate which is five times the flow rate of the flow control device 64, the temperature of the fluid finally delivered to the delivery pipe 46 will be substantially 110°.

At a fifth stage in the cycle of operation fluid from the cold fluid supply main 14 is passed through the shut-off valve 26 and the flow control device 33 to the delivery pipe 46. This fluid has not passed through either of the automatic temperature controlled mixer valves, and will be at whatever temperature the fluid in the cold fluid supply main is. When this cold fluid supply main is an ordinary city water tap the water might be at a temperature of 40° or 50°.

As was previously explained in connection with Figure 1 of the drawings, the versatility of the fluid control system of Figure 3 is apparent. With only two automatic temperature controlled mixer valves, a wide variety of temperatures may be obtained for the fluid finally delivered simply through the use of a plurality of shut-off valves and a plurality of constant rate of flow devices. Such an arrangement thus provides an extremely economical method of getting fluid at a plurality of different predetermined temperatures and of a plurality of different predetermined quantities at different successive stages in a cycle of operation.

While the tube delivery pipe 46 has been illustrated as a simple pipe, it will, of course, be understood that this is merely a diagrammatic illustration of the final delivery supply pipe to the delivery point. This pipe may, if desired, have more than one branch under the control of any suitable shut-off valve, such, for example, as when a spray-rinse is desired. The spray-rinse delivery pipe (not shown) will branch off from the main delivery pipe 46 so that the fluid is delivered at any point desired within or over the tub 50.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A fluid control system comprising at least two automatic temperature controlled mixer valves, each mixer valve having a pair of inlet ducts and a mixed fluid outlet duct, one of said inlet ducts being arranged to be connected to a source of fluid of relatively high temperature and the other being arranged to be connected to a source of fluid of relatively low temperature, the temperature of the mixed fluid automatically maintained in the outlet duct being a predetermined value between said high and low temperatures, a plurality of flow control means, each means including a shut-off valve and a device for automatically maintaining a constant predetermined rate of fluid flow therethrough when said shut-off valve is opened, there being at least two more flow control means than there are mixer valves, each of said outlet ducts being connected to the upstream side of a different one of said flow control means, the upstream side of two additional ones of said means also being connected, respectively, to one of said inlet ducts and one of said outlet ducts, said two additional flow control means providing rates of flow different from the others of said flow control means, and a member providing a common delivery passageway to which the downstream side of each of said flow control means is connected.

2. A fluid control system comprising at least two automatic temperature controlled mixer valves, each mixer valve having a pair of inlet ducts and a mixed fluid outlet duct, one of said inlet ducts being arranged to be connected to a source of fluid of relatively high temperature and the other being arranged to be connected to a source of fluid of relatively low temperature, the temperature of the mixed fluid automatically maintained in the outlet duct being a predetermined value between said high and low temperatures, a plurality of flow control means, each means including a shut-off valve and a device for automatically maintaining a constant predetermined rate of fluid flow therethrough when said shut-off valve is opened, there being at least two more flow control means than there are mixer valves, each of said outlet ducts being connected to the upstream side of a different one of said flow control means, the upstream side of two additional ones of said means also being connected respectively to one of said inlet ducts and one of said outlet ducts, said two additional flow control means providing rates of flow different from each other and also different from the others of said flow control means, and a member providing a common delivery passageway to which the downstream side of each of said flow control means is connected.

THOMAS B. CHACE.

REFERENCES CITED

The following references are of record in the file of this patent:

UNITED STATES PATENTS

| Number | Name | Date |
|---|---|---|
| 2,110,952 | Glenn | Mar. 15, 1938 |
| 2,296,266 | Breckenridge | Sept. 22, 1942 |
| 2,321,573 | Chace | June 15, 1943 |
| 2,425,788 | Edwards | Aug. 19, 1947 |